United States Patent
Huang

(10) Patent No.: US 8,506,677 B2
(45) Date of Patent: Aug. 13, 2013

(54) MEMBRANES AND REACTORS FOR $CO_2$ SEPARATION

(75) Inventor: Kevin Huang, Export, PA (US)

(73) Assignee: University of South Carolina, Columbia, SC (US)

( * ) Notice: Subject to any disclaimer, the term of this patent is extended or adjusted under 35 U.S.C. 154(b) by 214 days.

(21) Appl. No.: 13/181,987

(22) Filed: Jul. 13, 2011

(65) Prior Publication Data
US 2012/0014852 A1    Jan. 19, 2012

Related U.S. Application Data

(60) Provisional application No. 61/399,489, filed on Jul. 13, 2010.

(51) Int. Cl.
*B01D 53/22* (2006.01)
(52) U.S. Cl.
USPC .............. 95/51; 95/43; 95/45; 96/4; 96/10
(58) Field of Classification Search
USPC .................... 95/43, 45, 51; 96/4, 10
See application file for complete search history.

(56) References Cited

U.S. PATENT DOCUMENTS

| | | | | |
|---|---|---|---|---|
| 7,909,911 | B2* | 3/2011 | Lackner et al. | 95/51 |
| 7,938,890 | B2* | 5/2011 | Littau et al. | 96/4 |
| 2003/0196810 | A1* | 10/2003 | Vinegar et al. | 166/300 |
| 2009/0123361 | A1* | 5/2009 | Johannessen et al. | 423/352 |
| 2010/0224950 | A1* | 9/2010 | Dinyari et al. | 257/441 |
| 2011/0111314 | A1* | 5/2011 | Cui et al. | 429/417 |
| 2011/0168572 | A1* | 7/2011 | Huang | 205/763 |

OTHER PUBLICATIONS

Cho et al., "Fabrication and Characterization of γ-$LiAlO_2$ Matrices Using an Aqueous Tape-Casting Process", Journal of the American Ceramic Society, vol. 84, No. 5, 2001, pp. 937-940.

\* cited by examiner

*Primary Examiner* — Jason M Greene
*Assistant Examiner* — Anthony Shumate
(74) *Attorney, Agent, or Firm* — Dority & Manning, P.A.

(57) ABSTRACT

The present disclosure relates to a system for carbon dioxide separation. The system includes a conducting membrane having two phases. The first phase is a solid oxide porous substrate. The second phase is molten carbonate. The second phase is positioned within the solid oxide porous substrate of the first phase. The system also includes a $H_2$ and $CO_2$ gas input stream separated from a $CH_4$ gas input stream by the conducting membrane. The $CO_2$ is removed from the $H_2$ and $CO_2$ gas input stream as it contacts the membrane resulting in a $H_2$ gas output stream from the $H_2$ and $CO_2$ gas input stream and a CO and $H_2$ gas output stream from the $CH_4$ gas input stream.

18 Claims, 3 Drawing Sheets

MEMBRANES AND REACTORS FOR CO$_2$ SEPARATION

CROSS-REFERENCE TO RELATED APPLICATION

The present application is based on and claims priority to U.S. Provisional Application 61/399,489 having a filing date of Jul. 13, 2010, which is incorporated by reference herein.

BACKGROUND

Steam reforming of natural gas is a well-established, less expensive industrial process for producing commercial bulk hydrogen as well as the hydrogen used in the industrial synthesis of ammonia. The major advantage of the process is the ability to produce the highest yield of H$_2$ amongst any reformer type. At high temperature (700-1100° C.) and in the presence of a metal-based catalyst, often nickel, steam reacts with methane to yield CO and H$_2$ by the reaction $$CH_4 + H_2O = CO + 3H_2 \tag{1}$$

$$\Delta G° = 225{,}720 - 253.35 T \text{(J/mole)} \tag{2}$$

Additional H$_2$ can be recovered by a lower temperature water-gas-shift reaction with the CO produced via $$CO + H_2O = CO_2 + H_2 \tag{3}$$

$$\Delta G° = -35{,}948 + 31.98 T \text{(J/mole)} \tag{4}$$

However, one of the major drawbacks of the process is the production of large amount of CO$_2$ that needs to be captured in order to avoid emissions to the atmosphere. Such a capturing process is proven to be costly and energy intensive.

As such, a need exists for a CO$_2$ capture technology that addresses the shortcomings of conventional approaches. Methods of utilizing such technology would also be desirable.

SUMMARY

The present disclosure relates to a system for carbon dioxide separation. The system includes a conducting membrane having two phases. The first phase is a solid oxide porous substrate. The second phase is molten carbonate. The second phase is positioned within the solid oxide porous substrate of the first phase. The system also includes a H$_2$ and CO$_2$ gas input stream separated from a CH$_4$ gas input stream by the conducting membrane. The CO$_2$ is removed from the H$_2$ and CO$_2$ gas input stream as it contacts the membrane resulting in a H$_2$ gas output stream from the H$_2$ and CO$_2$ gas input stream and a CO and H$_2$ gas output stream from the CH$_4$ gas input stream.

In certain embodiments of the present disclosure a system for carbon dioxide separation is described. The system includes a conducting membrane having two phases. The first phase is a solid oxide porous substrate. The second phase is molten carbonate. The second phase is positioned within the solid oxide porous substrate of the first phase. The system further includes a water-gas shift reactor. The system also includes a H$_2$ and CO$_2$ gas input stream separated from a CH$_4$ gas input stream by the conducting membrane. The CO$_2$ is removed from the H$_2$ and CO$_2$ gas input stream as it contacts the membrane resulting in a H$_2$ gas output stream from the H$_2$ and CO$_2$ gas input stream and a CO and H$_2$ gas output stream from the CH$_4$ gas input stream. The CO and H$_2$ gas output stream contact the water-gas-shift reactor to form a H$_2$ and CO$_2$ gas output stream.

In still other embodiments of the present disclosure a method of carbon dioxide separation is described. The method includes contacting a H$_2$ and CO$_2$ gas input stream with a conducting membrane having two phases. The first phase is a solid oxide porous substrate. The second phase is positioned within the solid oxide porous substrate of the first phase and is a molten carbonate. The method further includes utilizing the conducting membrane to separate the H$_2$ and CO$_2$ gas input stream from a CH$_4$ gas input stream. The the CO$_2$ is removed from the H$_2$ and CO$_2$ gas input stream as it contacts the membrane resulting in a H$_2$ gas output stream from the H$_2$ and CO$_2$ gas input stream and a CO and H$_2$ gas output stream from the CH$_4$ gas input stream.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures in which.

DETAILED DESCRIPTION

Reference will now be made in detail to embodiments of the disclosed subject matter, one or more examples of which are set forth below. Each example is provided by way of explanation of the subject matter, not limitation of the subject matter. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

Described herein is a novel mixed carbonate ion and oxide ion conducting (MOCC) membrane that is capable of separating CO$_2$ from a fuel gas stream of H$_2$+CO$_2$. The proposed composite mixed conducting CO$_2$ separation membrane is based on the electrochemical principle. A conceptual reactor system using this kind of membrane material is also disclosed.

Figure 1:
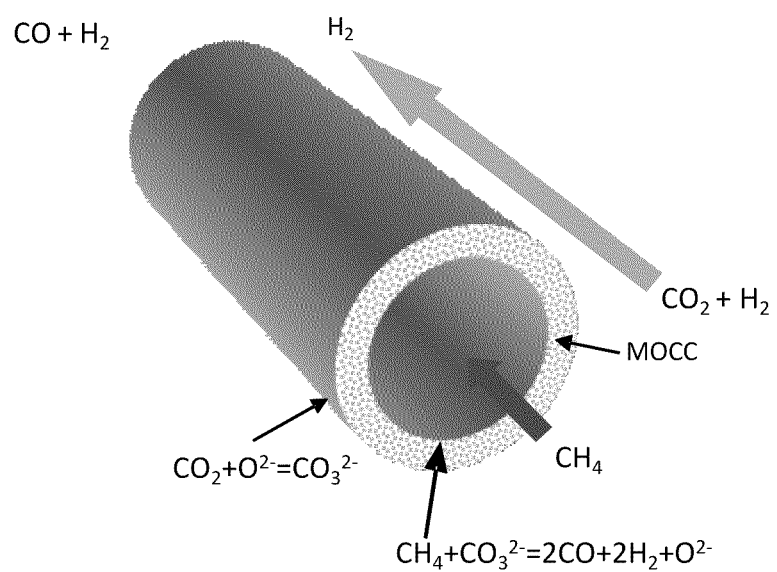
FIG. 1 illustrates a schematic of a mixed oxide-ion and carbonate-ion conductor (MOCC) membrane separating CO$_2$ from CO$_2$+H$_2$ mixture and reacting with methane in accordance with certain embodiments of the present disclosure.

The disclosed mixed carbonate ion and oxide ion conductor is comprised of two phases. One phase is the porous substrate made of solid oxides such as doped CeO$_2$ and doped ZrO$_2$. Another phase is the molten carbonates that are held within pores of the porous solid oxide substrate by the capillary force. FIG. 1 shows the conceptual schematic of the mixed conductor. The functionality of the porous solid oxide substrate is multiple. First, it provides the pathways for oxide ions to involve in the electrochemical reactions occurring at the gas-solid-liquid surfaces. Second, the physical pores in the porous structure serve as the placeholder for the molten carbonates held by the capillary force. Third, the solid oxide porous structure also acts as the mechanical support. During separation process, the carbonate ions in molten carbonate phase migrate from high end of chemical potentials of CO$_2$ in $H_2+CO_2$ to the low end of $CO_2$ in methane. The electrode reactions at the two reactive surfaces are expressed by:

At $CO_2$-rich side with fuel gas:

$$CO_2(H)+O_2 = CO_3^{2-} \quad (5)$$

At $CO_2$-lean side with methane:

$$CH_4+CO_3^{2-} = 2CO+2H_2+O^{2-} \quad (6)$$

Overall reaction:

$$CO_2(H)+CH_4 = 2CO+2H_2 \quad (7)$$

Reaction (7) depicts the completion of the separation of $CO_2$ from $H_2+CO_2$ and reaction with $CH_4$ to produce syngas. Syngas (also known as synthetic gas or synthesis gas) is the name given to a gas mixture that contains varying amounts of carbon monoxide and hydrogen. The production of lower ratio of $H_2/CO$ is more favorable to the process for making synthetic fuels.

Figure 2:
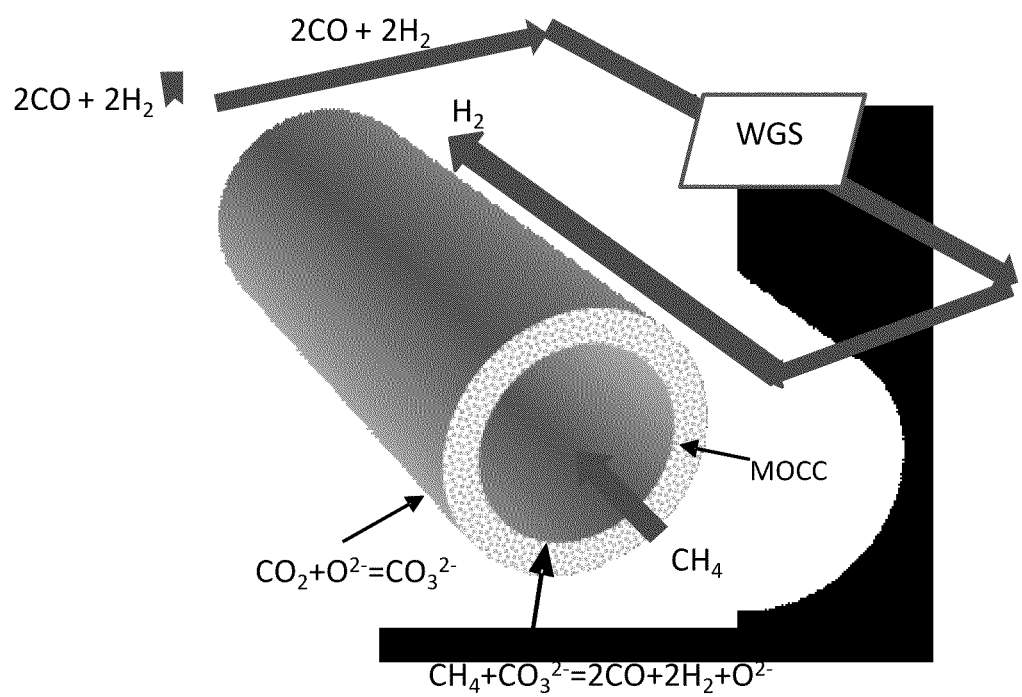
FIG. 2 illustrates a schematic of the hydrogen production reactor based on mixed conducting membrane with zero CO$_2$ emissions in accordance with certain embodiments of the present disclosure.

To integrate the mixed conducting membrane into a chemical reactor, FIG. 2 illustrates a new concept of producing hydrogen without generating $CO_2$ to downstream. A portion of the syngas produced at the permeate side by dry reforming $CH_4$ can be redirected to a water-gas shift reactor, where the product $CO_2+H_2$ can then be recycled back to the feeding side of the membrane for further separation of $CO_2$. The water-gas shift reaction (WGS) is a chemical reaction in which carbon monoxide reacts with water vapor to form carbon dioxide and hydrogen:

$$CO_{(g)}+H_2O_{(v)} \rightarrow CO_{2(g)}+H_{2(g)} \quad (8)$$

It is apparent that the product from such a reactor is the pure $H_2$ and syngas and the feedstock is the methane. All $CO_2$ produced is permeated through the membrane back to the feeding side to react with incoming $CH_4$. No physical emissions or generation of $CO_2$ are sent to downstream. This feature is particularly important as the expensive and energy intensive $CO_2$ capturing process is no longer needed. Therefore, the invented reactor system is expected to be highly competitive in economics.

The following examples are meant to illustrate the disclosure described herein and are not intended to limit the scope of this disclosure.

EXAMPLES

Preparation of MOCC

The solid-oxide phase in this disclosure was a gadolinium-doped $CeO_2$, $Ce_{0.9}Gd_{0.1}O_{2-\delta}$, (denoted as GDC), and the molten carbonate phase was a binary eutectic mixture of $Li_2CO_3$ and $K_2CO_3$ in a molar ratio of 62:38 (denoted as MC). The GDC powder was prepared using the Glycine Nitrate Combustion method, described in J. Y. Cho, S. H. Hyun, S. A. Hong, J. Am. Ceram. Soc., 84, 937 (2001), incorporated by reference herein, followed by calcining at 600° C. for 4 hours to remove any trace of remaining organics. The binary eutectic salt MC was synthesized by solid state reaction between $Li_2CO_3$ and $K_2CO_3$ powders (99.9%, Alfa Aesar Chemicals) at 600° C. for 2 hours. After cooling down to room temperature, the melt was then broken up and ball-milled with a high energy milling machine (McCrone Micronizing Mill). The obtained submicron MC powder was then intimately blended with GDC powder in ethanol in a predetermined volumetric ratio of 55:45 (MC:GDC), followed by calcining at 650° C. for 2 hours to ensure homogenization of MC with GDC particles. Thus pre-reacted powder was ball-milled for the second time and uniaxially pressed at 200 MPa into pellets (13 mm in diameter and 2-5 mm in thickness). The MOCC pellets were finally sintered at 650° C. for 2 hours and ready for subsequent electrochemical characterizations. The diameters of the pellets became 12.69±0.08 mm after sintering. All heat treatments of the samples were carried out in open air.

The sample preparation is described as follows. The $Li_2CO_3$ and $K_2CO_3$ mixture of eutectic composition was heated in air to 650° C. at a ramp rate of 2° C./min. After holding for 2 hours, the melt was then quenched to room temperature. A small disc sample was then cut from the bulk for conductivity measurement.

Figure 3:
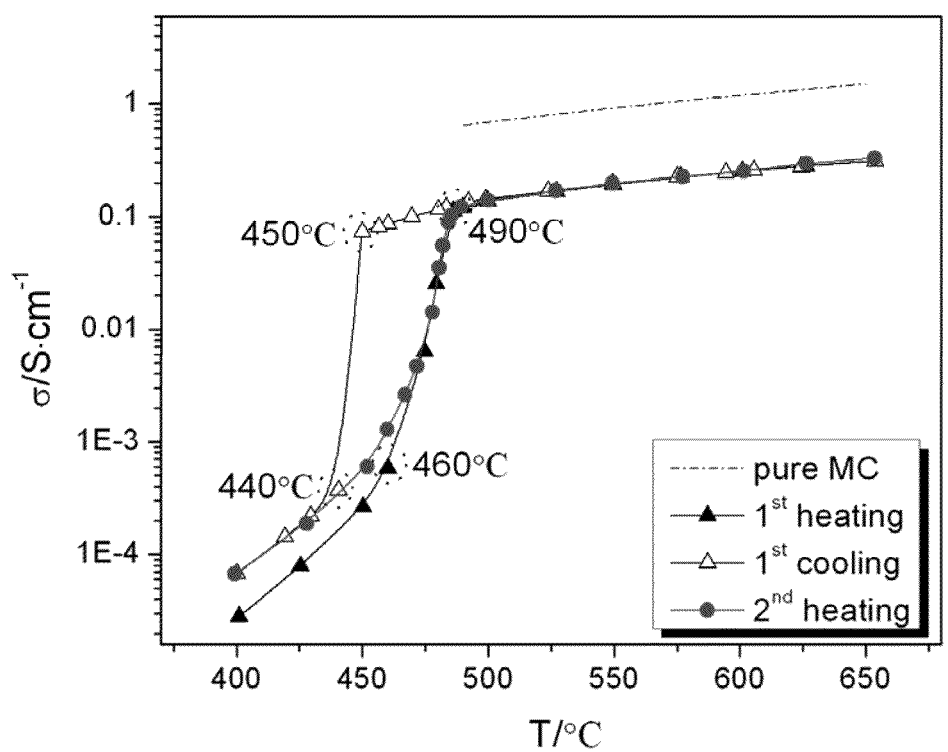
FIG. 3 illustrates a plot of the effective ionic conductivity of MOCC as a function of temperature in accordance with certain embodiments of the present disclosure.

The effective ionic conductivity ($G_m$) of the MOCC obtained from the high-frequency intersection of the spectrum with the Z'-axis is plotted in FIG. 3 as a function of temperature for one and half thermal cycles. The $\sigma_m$ exhibits three distinct changes with temperature at t<460° C., 460° C≦t≦490° C. and t≧490° C. during heating. The higher activation energy observed at t<460° C. is a clear indication of the grain and grain-boundary contributions in solid-state MOCC. When the MC in the MOCC becomes softened in the range 460° C.≦t<490° C., the $\sigma_m$ experiences the strongest dependence on temperature. The $G_m$ is changed by two orders of magnitude within a 30° C. temperature window. At t≧490° C., the MC completely melts; the conductivity becomes less dependent on temperature and follows a very similar trend to that of the pure MC phase as indicated by the dotted line in FIG. 3. The similarity in activation energy evidently suggests that carbonate-ions are the dominant charge carriers in the MOCC at t≧490° C. In the same temperature regime at t≧490° C., the conductivity upon cooling is essentially the same as those measured upon heating. However, this trend of higher conductivity and lower activation energy is retained to a lower temperature than 490° C., e.g., 450° C., after which a rapid decrease in conductivity from 450 to 440° C. is observed. At t<440° C., the $\sigma_m$ measured during cooling is higher than that measured on heating, but with a similar temperature-dependence. This higher $\sigma_m$ is further retained during the second heating at t≦475° C., above which it is indistinguishable to that measured during the first heating cycle.

To better understand the conductivity hysteresis phenomenon, the melting behavior of the MOCC was analyzed by DSC. A thermal hysteresis is also observed in the melting/solidifying process of the MOCC. A strong endothermic peak is evident at around 483° C. during the heating. This temperature not only matches well with the eutectic point of the MC phase (490±5° C. for 62 mol % $Li_2CO_3$—$K_2CO_3$), suggesting its relevance to the melting of the carbonate phase, but also supports the conductivity dependence on temperature during heating as shown in FIG. 3. However, the melt did not solidify until 440° C. as shown by the exothermic peak measured during cooling. This delay of solidification to a lower temperature explains why the conductivity measured during the same cycle remains high to as low as 440° C. The underlying mechanism of higher conductivity observed after t<440° C. in the cooling is unclear. A gradual sintering of solid oxide phase promoted by the presence of molten carbonate phase could account for the improved $\sigma_m$ during the $2^{nd}$ heat cycle.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so further described in such appended claims. $CeO_2$ and $ZrO_2$ are used herein to illustrate the porous solid oxide phase substrate of the present invention but are not intended to limit the scope of the invention.

What is claimed:

1. A system for carbon dioxide separation comprising:
   a conducting membrane comprising two phases, the first phase comprising a solid oxide porous substrate, the second phase comprising molten carbonate, wherein the second phase is positioned within the solid oxide porous substrate of the first phase; and
   a $H_2$ and $CO_2$ gas input stream separated from a $CH_4$ gas input stream by the conducting membrane, wherein the $CO_2$ is removed from the $H_2$ and $CO_2$ gas input stream as it contacts the membrane resulting in a $H_2$ gas output stream from the $H_2$ and $CO_2$ gas input stream and a CO and $H_2$ gas output stream from the $CH_4$ gas input stream.

2. A system as in claim 1, wherein the $CO_2$ forms $CO_3^{2-}$ when contacting the membrane.

3. A system as in claim 2, wherein the $CO_3^{2-}$ contacts the $CH_4$ gas input stream to form the CO and $H_2$ gas output stream.

4. A system as in claim 1, wherein the solid oxide porous substrate comprises doped $CeO_2$.

5. A system as in claim 1, wherein the solid oxide porous substrate comprises doped $ZrO_2$.

6. A system as in claim 1, further comprising a water-gas shift reactor, wherein the CO and $H_2$ gas output stream contact the water-gas shift reactor to form a $H_2$ and $CO_2$ gas output stream.

7. A system as in claim 6, wherein the $H_2$ and $CO_2$ gas output stream combines with the $H_2$ and $CO_2$ gas input stream.

8. A system as in claim 1, wherein the second phase is held in place within the solid oxide porous substrate of the first phase by capillary force.

9. A system for carbon dioxide separation comprising:
   a conducting membrane comprising two phases, the first phase comprising a solid oxide porous substrate, the second phase comprising molten carbonate, wherein the second phase is positioned within the solid oxide porous substrate of the first phase;
   water-gas shift reactor; and
   a $H_2$ and $CO_2$ gas input stream separated from a $CH_4$ gas input stream by the conducting membrane, wherein the $CO_2$ is removed from the gas input stream as it contacts the membrane resulting in a $H_2$ gas output stream from the $H_2$ and $CO_2$ gas input stream and a CO and $H_2$ gas output stream from the $CH_4$ gas input stream, and wherein the CO and $H_2$ gas output stream contact the water-gas-shift reactor to form a $H_2$ and $CO_2$ gas output stream.

10. A system as in claim 9, wherein the $H_2$ and $CO_2$ gas output stream combines with the $H_2$ and $CO_2$ gas input stream.

11. A method of carbon dioxide separation comprising:
    contacting a $H_2$ and $CO_2$ gas input stream with a conducting membrane comprising two phases, the first phase comprising a solid oxide porous substrate, the second phase is positioned within the solid oxide porous substrate of the first phase and comprises molten carbonate; and
    utilizing the conducting membrane to separate the $H_2$ and $CO_2$ gas input stream from a $CH_4$ gas input stream, wherein the $CO_2$ is removed from the $H_2$ and $CO_2$ gas input stream as it contacts the membrane resulting in a $H_2$ gas output stream from the $H_2$ and $CO_2$ gas input stream and a CO and $H_2$ gas output stream from the $CH_4$ gas input stream.

12. A method as in claim 11, further comprising forming $CO_3^{2-}$ when the $CO_2$ contacts the membrane.

13. A method as in claim 12, further comprising contacting $CO_3^{2-}$ with the $CH_4$ gas input stream to form the CO and $H_2$ gas output stream.

14. A method as in claim 11, wherein the solid oxide porous substrate comprises doped $CeO_2$.

15. A method as in claim 11, wherein the solid oxide porous substrate comprises doped $ZrO_2$.

16. A method as in claim 11, further comprising contacting the CO and $H_2$ gas output stream with a water-gas-shift reactor to form a $H_2$ and $CO_2$ gas output stream.

17. A method as in claim 16, further comprising combining the $H_2$ and $CO_2$ gas output stream with the $H_2$ and $CO_2$ gas input stream.

18. A method as in claim 11, wherein the second phase is held in place within the solid oxide porous substrate of the first phase by capillary force.

* * * * *

UNITED STATES PATENT AND TRADEMARK OFFICE
CERTIFICATE OF CORRECTION

PATENT NO. : 8,506,677 B2  
APPLICATION NO. : 13/181987  
DATED : August 13, 2013  
INVENTOR(S) : Kevin Huang Page 1 of 1

It is certified that error appears in the above-identified patent and that said Letters Patent is hereby corrected as shown below:

In the Specification

Column 1, line 10, please insert the following paragraph:

--GOVERNMENT CLAUSE
This invention was made with government support under W91CRB-10-1-0007 awarded by DARPA/Office of Naval Research. The government has certain rights in the invention.--

Signed and Sealed this
Nineteenth Day of November, 2013

Teresa Stanek Rea
*Deputy Director of the United States Patent and Trademark Office*